Aug. 11, 1959   H. A. ROBINSON   2,898,724
POWER DRIVEN LAWN RAKE
Filed Aug. 12, 1957   2 Sheets-Sheet 1
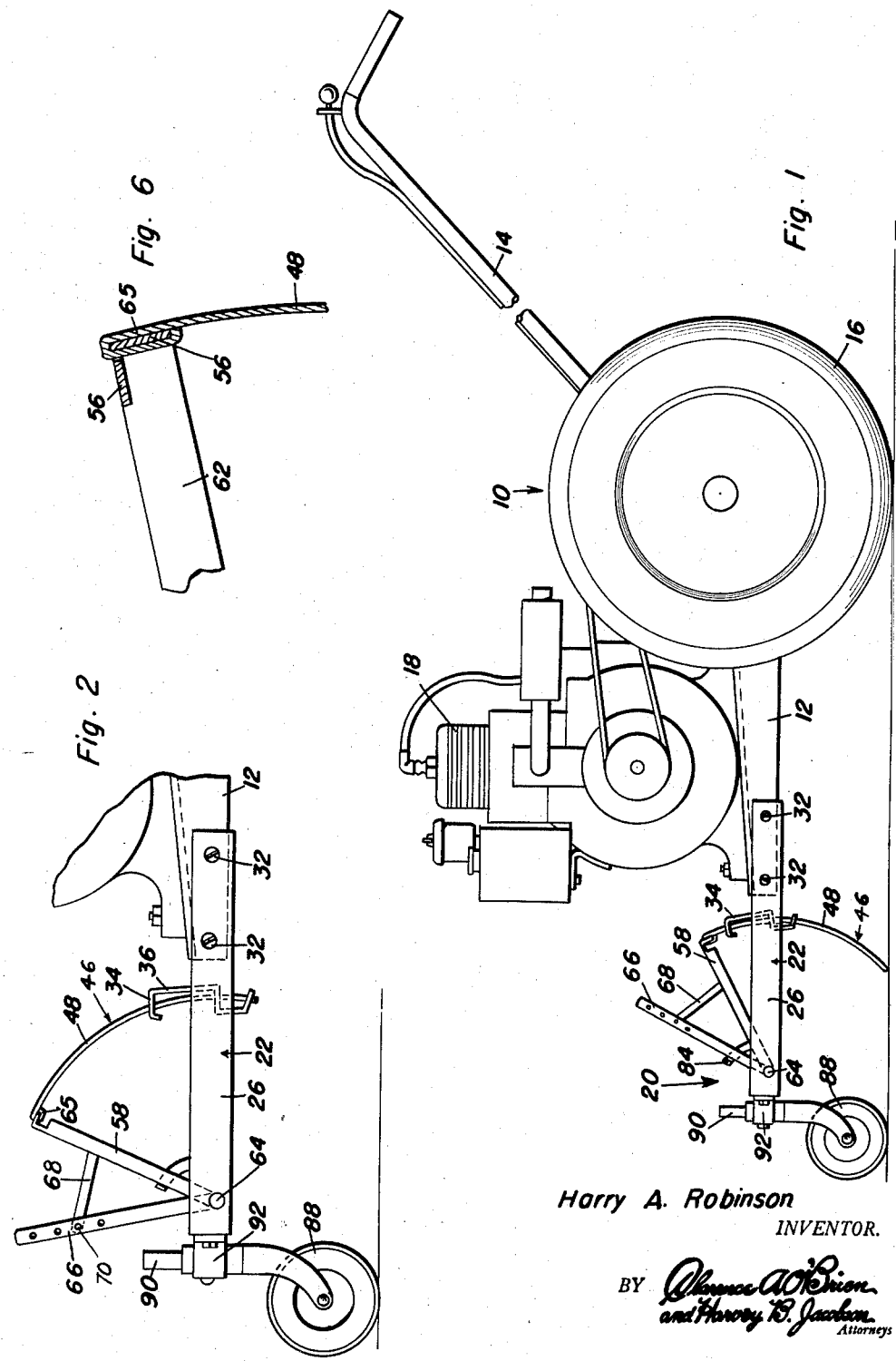
Harry A. Robinson
INVENTOR.

Aug. 11, 1959  H. A. ROBINSON  2,898,724
POWER DRIVEN LAWN RAKE
Filed Aug. 12, 1957  2 Sheets-Sheet 2

Harry A. Robinson
INVENTOR.

United States Patent Office 2,898,724
Patented Aug. 11, 1959

2,898,724

POWER DRIVEN LAWN RAKE

Harry A. Robinson, Elkhart, Ind.

Application August 12, 1957, Serial No. 677,445

6 Claims. (Cl. 56—27)

This invention relates to a rake attachment for a garden tractor.

An object of the invention is to provide a rake attachment for a small tractor or lawn mower provided with a source of motive force, the rake attachment being mechanically simple and of a novel construction. The attachment is coupled very easily to an ordinary small garden tractor or small vehicle of somewhat similar dimension and having a tine arrangement enabling the tines to be each cleaned to discharge not only the grass, refuse, etc., but also to individually clean the tines.

The means for dumping the rake and simultaneously cleaning the tines consists in a frame member that has a plurality of openings through which the tines pass. The tines are supported in a group, so that manipulation of a single lever will cause all of the tines to be moved in a cleaning manner through the number of openings.

Another object of the invention is to provide a rake attachment for a small vehicle, the rake attachment being capable of sole use or in groups. In either case, manipulation of a handy single lever is all that is required to clean the tines and/or empty the load.

A rake attachment constructed in accordance with the invention may be pushed or pulled, depending on the desires of the user and the equipment with which the attachment is used.

Other objects and features of importance will become apparent in following the description of the illustrated form of the invention.

In the drawings:

Figure 1 is a fragmentary side view of a small tractor fitted with a rake that exemplifies the principles of the invention;

Figure 2 is a fragmentary, elevational view on enlarged scale showing the attachment in the dumping and/or rake tine cleaning position;

Figure 6 is an enlarged elevational view with parts broken away and shown in section of one of the tines and taken on enlarged scale along the line 6—6 of Figure 4.

Figure 4:
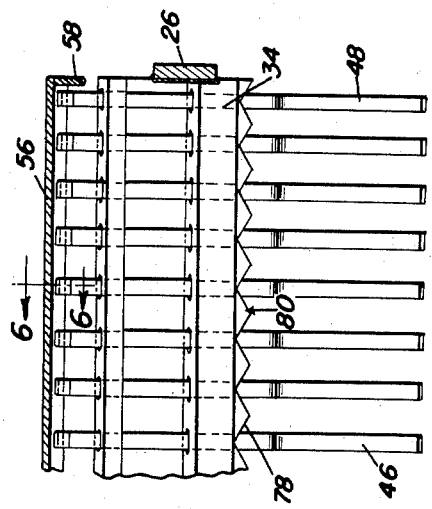
Figure 4 is a fragmentary, sectional view taken approximately in the plane of line 4—4 of Figure 3.
Figure 3:
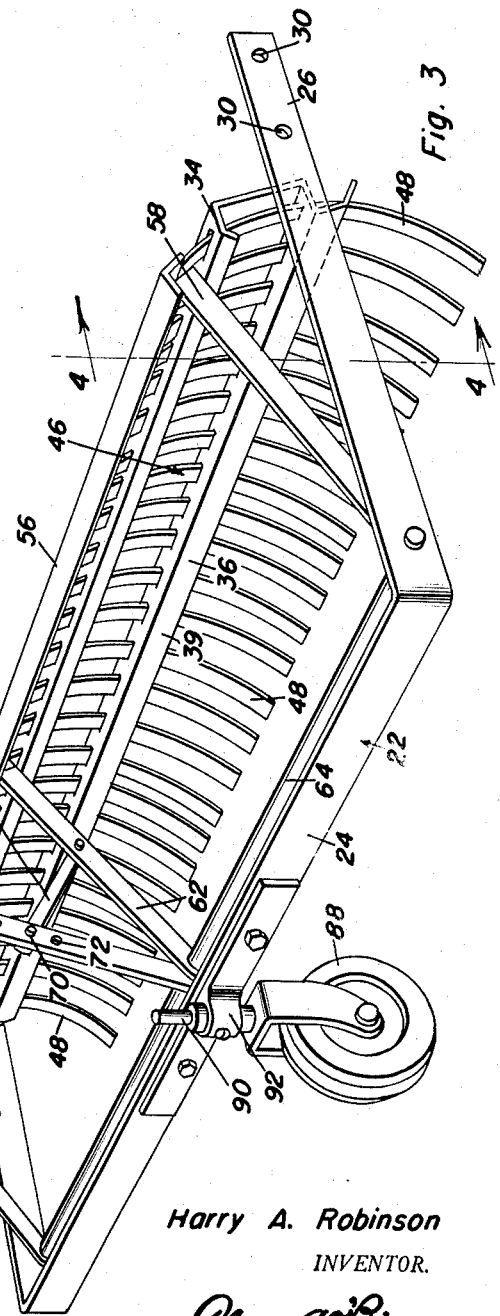
Figure 3 is an enlarged perspective view of the attachment in Figure 1.

In the accompanying drawings, there is a small vehicle 10. This small vehicle may be a small tractor that is under the control of a walking attendant or some other power equipment of small dimension, such as a power lawn mower. The illustrated vehicle has a chassis 12, handles 14 and a pair of wheels 16 which form the sole ground support for the vehicle. The power plant 18 is carried by the chassis and is drivingly connected with at least one of the wheels of the tractor.

Attachment 20 is secured to the front end of the chassis. The attachment is made of a frame 22 that has a cross member 24, together with sides 26 and 28. The front cross member and sides are of approximate U-shaped configuration, with the free ends of the sides formed with a plurality of holes 30 in which fasteners, such as bolts, are adapted to be placed for securing frame 22 to the chassis 12. Other hitches may be worked out, but the use of bolts 32 passing through holes in the sides of frame 22 is an exceedingly simple but effective type of hitch.

A frame member 34 extends between the sides 26 and 28 and is welded or otherwise fastened in place. The cross sectional shape of cross member 34 is in essence two channels with a common wall between them and with the channels opening in opposite directions. The upper channel 36, then, has a top wall 37 with a depending flange 38 along one edge and a depending wall 39 at the opposite edge. The common wall 40 is parallel to top wall 37 and extends rearwardly from wall 39 and at right angles to it. The lower channel 41 is constructed of the common wall 40 which is joined at right angles to wall 42 depending from wall 40. The angulated bottom wall 43 is joined along the lower edge of wall 42.

Figure 5:
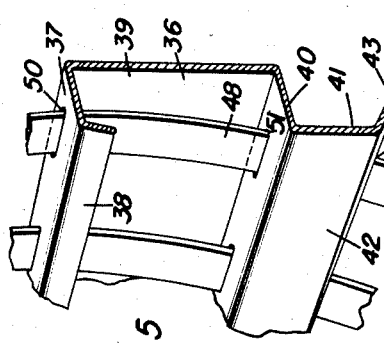
Figure 5 is an enlarged, fragmentary view with parts broken away and shown in section showing a part of the means by which to dump and clean the tines of the attachment.

The rake has a group 46 of tines 48. The tines are rectangular in cross section, constructed of spring steel or some other suitable metal, and they are each longitudinally curved with the preference being arcuate. Each of the tines 48 is passed through three holes in the frame member 34. A typical tine in Figure 5 passes through upper hole 50, intermediate hole 51 and between teeth 78 formed in the walls 37, 40 and 43 respectively of the frame member 34. Inasmuch as the illustrated tines are rectangular in cross section, the holes in the cross member are also rectangular. Should the tines be of some other shape, the holes would preferably be of a corresponding shape.

Transverse elongate, angle member 56 is attached at its ends to arms 58 and 60 and at its center to arm 62. The opposite ends of the three arms 58, 60 and 62 are attached to shaft 64 that extends across and that is mounted for rotation within the sides 26 and 28 of frame 22. All of the tines 48 are attached to the angle member 56 by having a loop 65 (Figure 6) at their upper ends through which member 56 extends. Slots are formed in the front flange of the angle member 56 in order to accommodate the loops 65 of the tines 48. Accordingly, when the lever 66 is oscillated, it raises and lowers the frame formed by arms 58, 60 and 62, causing it to rock about an axis established by shaft 64 to which all of these parts are secured, including the angle member 56. Lever 66 has link 68 connected adjustably to it by pin 70 which passes through a selected aperture 72 formed in a group along the length of lever 66. This adjusts the position of the lever 66 with respect to the frame, inasmuch as lever 66 is rotatable on shaft 64 and arm 62 is fixed to the same shaft. As the frame is oscillated, the tines are drawn through the holes in the frame member 34, thereby cleaning the tines by scraping the accumulation of refuse therefrom. In addition, the roll of grass, vines, etc. behind the group 46 of tines is discharged by elevating the group of tines. As shown in Figure 4, the lower edge of wall 43 has teeth 78 that form downwardly opening pockets or notches through which the tines are drawn. These teeth form a comb 80 which provides the majority of the cleaning action on the tines as they are raised. The upward extent of travel of the tines is limited by stop 84 at the end of mounting bracket 86. This bracket is welded or otherwise secured to either of the sides of the frame 22 and is located in the path of travel of one of the end arms 58 or 60 to thereby limit the extent of pivotal movement of the frame supporting the group 46 of tines 48 by having either arm 58 or arm 60 contact the stop 84, depending on whether the bracket 86 is used on the right or left side of frame 22.

In the installation shown in Figure 1, a caster 88 is suggested due to the nature of vehicle 10. This caster is mounted at the lower end of a wheel spindle 90, the latter supported by bearing 92 that is fixed to the center of the frame member 24.

The use of the invention suggests itself in inspection of Figures 1 and 2. After the attachment is applied to the vehicle 10, it is attended while being propelled across the lawn, soil, gravel or cinder driveway, etc. The accumulation of tines 48 is capable of being dumped by operating the lever 66 in the manner described previously. By coupling two or more attachments, they may be made to operate simultaneously and they also may be made to dump simultaneously by connecting shaft 64 of each together or by making the shaft one piece.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a small vehicle which has a chassis, said attachment comprising a rake that has a rigid frame provided with sides, a frame member extending across and secured to said sides, said frame member having upper and lower walls that are spaced from each other and that are provided with groups of holes, a group of tines, means holding said tines in predetermined spaced relationship to form a unit, said tines passed through said groups of holes, and means connected with said tines for elevating said tines and thereby pulling them partially through said groups of holes to dump the accumulation around the tines and to clean the tines simultaneously, said tine raising means including a second frame, an elongate member constituting a part of said second frame, means securing the upper parts of each of said tines to said elongate member, said second frame having arms secured to said elongate member, a shaft to which said arms are fixed, said shaft mounted for oscillation in said sides of the first mentioned frame, and a comb on said frame member along the lower edge thereof between the teeth of which said tines are movable.

2. The rake attachment of claim 1 wherein said frame member is constructed of a forwardly and a rearwardly opening channel, said channels having a common wall, said comb formed along the lower edge of one wall of the lower channel, and said holes in said cross member being in other walls of said channels.

3. In combination with a small vehicle, a rake attachment comprising a rigid frame of substantially U-shaped configuration and having sides and a cross member rigidly attached to one pair of ends of said sides, means associated with said sides to attach the opposite ends of said sides to the small vehicle, a frame member secured to said sides intermediate said ends of said sides and extending parallel to said cross member, a group of tines, a second frame holding said tines assembled as a unit, means mounting said second frame for oscillation on said sides of said rigid frame, said frame member that extends across said sides having apertures through which said tines pass and having a comb provided with teeth that protrude between said tines, and means connected to said second frame for elevating said second frame and thereby moving said tines through said comb and said apertures to clean and dump the tines.

4. The combination of claim 3 and a stop attached to said frame and engageable by a part of said second frame to limit the movement of said second frame with respect to said first frame and in one direction to prevent said tines from separating from said apertures.

5. The combination of claim 3 wherein said tines are each longitudinally curved and have loops at their upper ends, said second frame having a frame member provided with a plurality of apertures through which said loops are passed to connect said tines to said second frame.

6. A rake attachment comprising a rigid frame of substantially U-shaped configuration and having sides and a cross member rigidly attached to one pair of ends of said sides, a frame member secured to said sides intermediate the ends of said sides and extending parallel to said cross member, a group of tines, a second frame holding said tines assembled as a unit, means mounting said second frame for oscillation on said sides of said rigid frame, said frame member that extends across said sides having apertures through which said tines pass and having a comb provided with teeth that protrude between said tines, and means connected to said second frame for elevating said second frame and thereby moving said tines through said comb and said apertures to clean and dump the tines.

References Cited in the file of this patent

UNITED STATES PATENTS

| | | |
|---|---|---|
| 788,667 | McCann | May 2, 1905 |
| 1,020,228 | Sukm | Mar. 12, 1912 |
| 2,712,212 | Sears | July 5, 1955 |
| 2,751,741 | Carson | June 26, 1956 |

FOREIGN PATENTS

| | | |
|---|---|---|
| 1,063,500 | France | Dec. 16, 1953 |